United States Patent [19]

Goodchild

[11] 3,838,558
[45] Oct. 1, 1974

[54] AIR CUSHIONED LAWN MOWER AND GRASS COLLECTOR

[76] Inventor: Dennis C. Goodchild, Lake View Manor, 1960 Lee Rd., Orlando, Fla. 32180

[22] Filed: Mar. 5, 1973

[21] Appl. No.: 325,194

[52] U.S. Cl............................. 56/12.8, 56/DIG. 3
[51] Int. Cl............................................ A01d 53/00
[58] Field of Search........... 56/12.8, DIG. 3, DIG. 8, 56/202

[56] References Cited
UNITED STATES PATENTS

| | | | |
|---|---|---|---|
| 3,170,276 | 2/1965 | Hall | 56/12.8 |
| 3,186,151 | 6/1965 | Hansom | 56/12.8 |
| 3,320,731 | 5/1967 | Cody et al. | 56/12.8 |
| 3,400,523 | 9/1968 | Klingofstrom et al. | 56/DIG. 3 |

*Primary Examiner*—Louis G. Mancene
*Assistant Examiner*—J. N. Eskovitz
*Attorney, Agent, or Firm*—Duckworth, Hobby & Allen

[57] ABSTRACT

A lawn mower including inner and outer shrouds and an impeller for developing air pressure between the shrouds sufficient to provide lift. The inner shroud includes means for utilizing inwardly directed airflow for grass ejection and collection.

7 Claims, 7 Drawing Figures

3,838,558

AIR CUSHIONED LAWN MOWER AND GRASS COLLECTOR

BACKGROUND OF THE INVENTION

1. Field of the Invention

The present invention relates to lawn mowers, and the like, and in particular, is directed to air cushioned lawn mowers employing grass collection means.

2. Description of the Prior Art

A wide variety of wheeled lawn mower arrangements have been developed in the past. Some wheeled lawn mowers utilize the upwardly directed air pressure developed by horizontally disposed, rotating blade to blow cut grass, leaves, and the like, and to a collection receptacle.

There have been suggestions in the prior art to adapt the well-known air cushion principle to lawn mowers. See for example U.S. Pat. Nos. 3,110,996 to Dahlman; 3,423,912 to Heth; and 3,170,276 to Hall.

SUMMARY OF THE INVENTION

The present invention contemplates a lawn mower comprising apparatus including a moving blade for cutting grass, and means with the apparatus for suspending the apparatus on a cushion of air. The apparatus further includes means cooperating with the suspending means for collecting matter cut by the blade.

THE DRAWING

DETAILED DESCRIPTION

Figure 1:
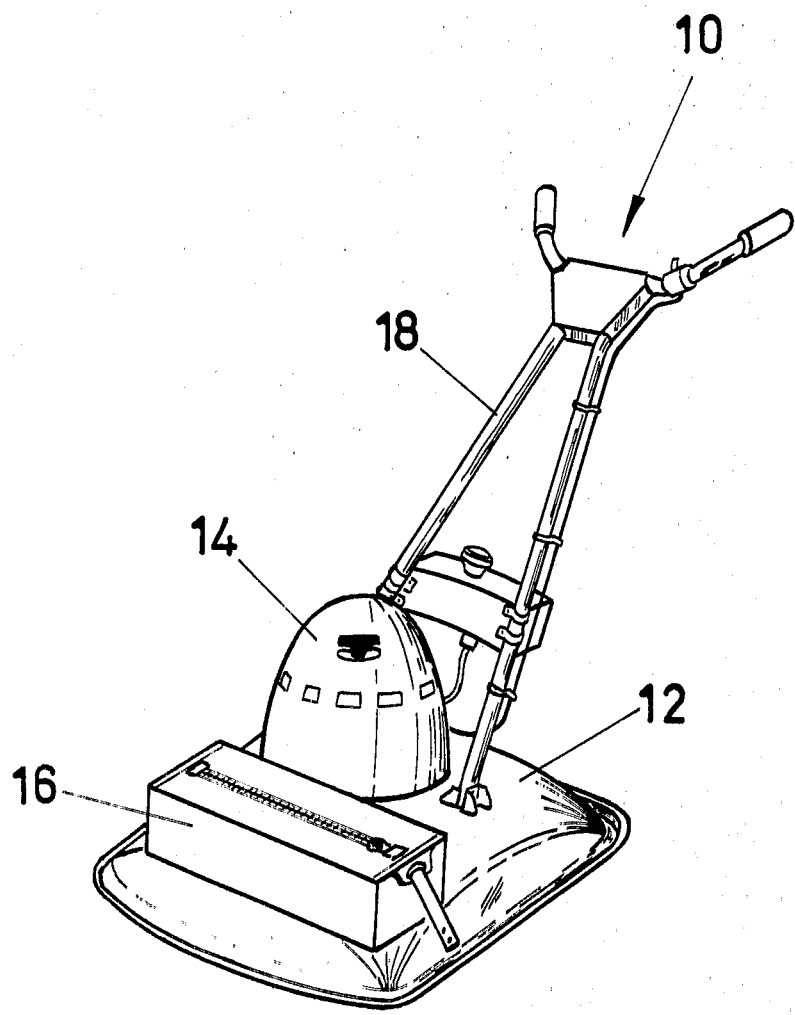
FIG. 1 is a perspective view of an embodiment of the air cushion lawn mower of the present invention.

An embodiment of an air cushioned lawn mower in accordance with the present invention is shown in FIG. 1. The lawn mower, referred to generally as 10, includes an outer shroud 12, a motor 14 and a grass receptacle 16, all of which are described in greater detail with reference to FIGS. 2–7. The lawn mower 10 further includes a handle 18 joined to the outer shroud 12.

Figure 3:
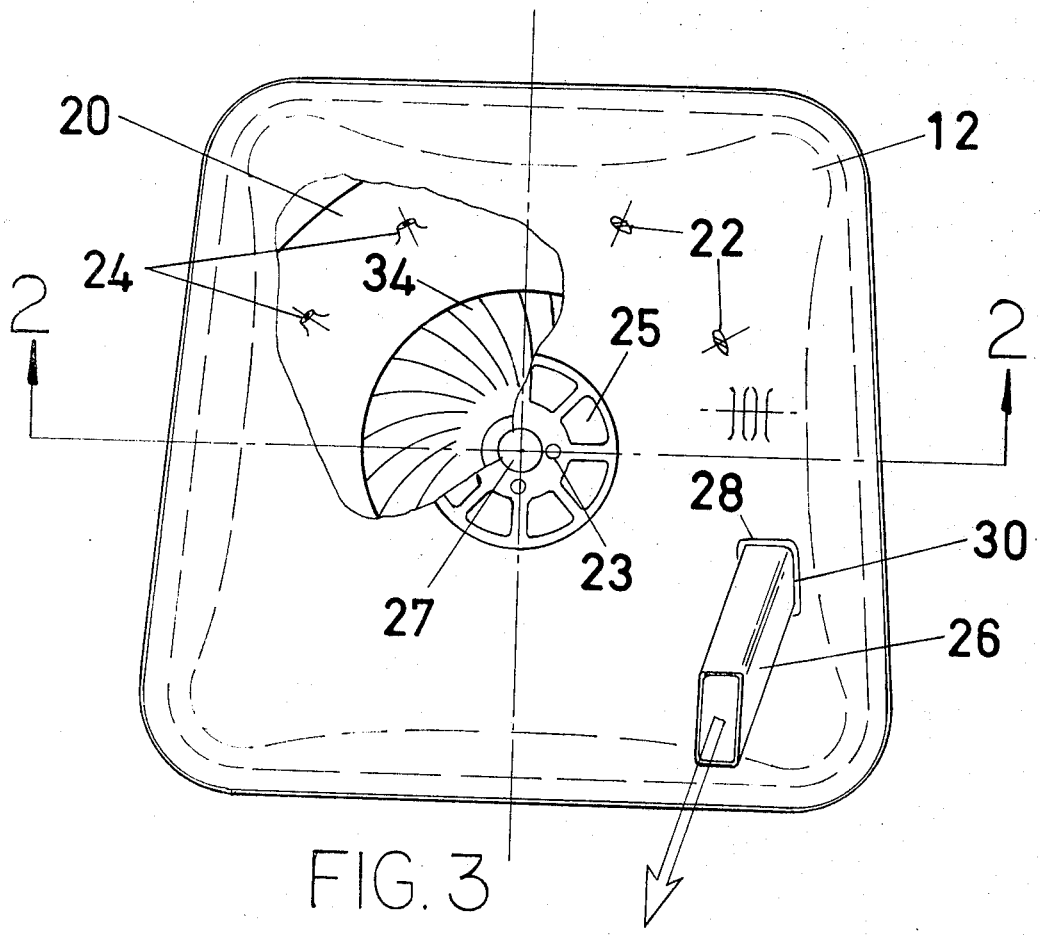
FIG. 3 is a top plan view, partially cut away, of that portion of the apparatus shown in FIG. 2, the cross section of FIG. 2 being taken along the lines 2—2' in FIG. 3.
Figure 2:
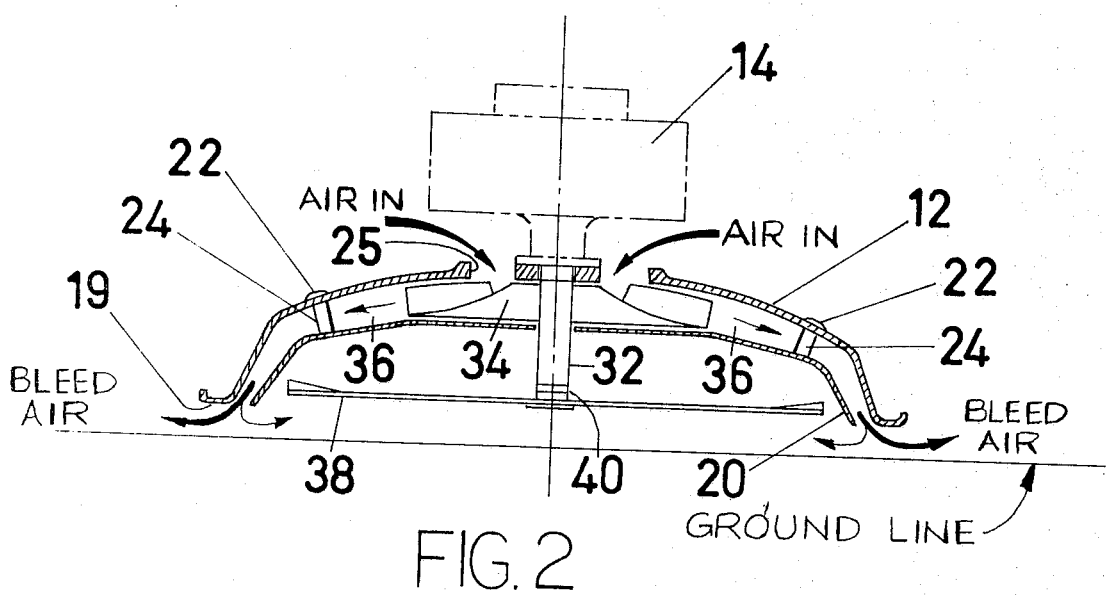
FIG. 2 is a side view, in cross section, of the apparatus of FIG. 1 with the prime mover shown in relief and with other portions of the apparatus removed.
Figure 4:
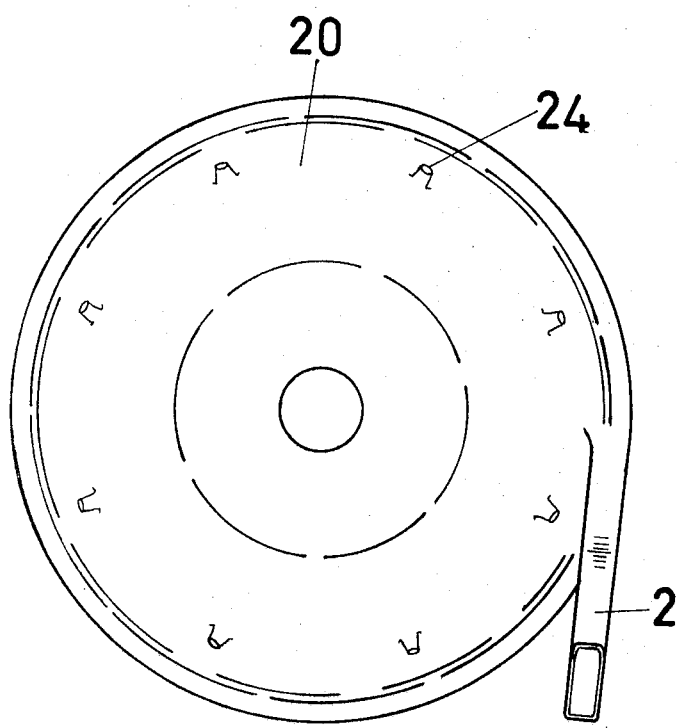
FIGS. 4 and 5 are top plan and side views, respectively, of a portion of the apparatus shown in FIGS. 2 and 3.
Figure 5:
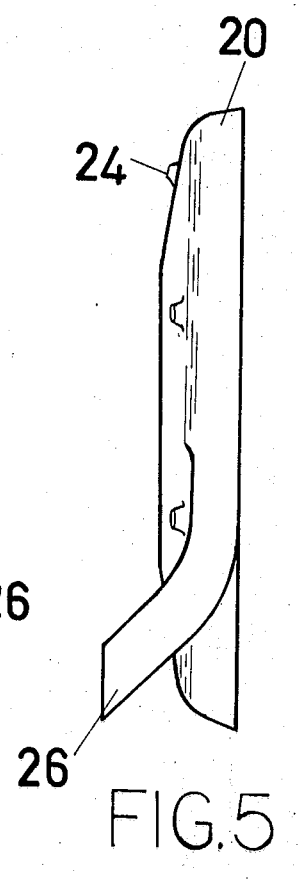

Referring now to FIGS. 2 and 3, the outer shroud 12 is trapezoidal in shape with its lower surface open and inplane. The lower outer peripheral edge 19 of the outer shroud 12 is double flanged to aid movement over rough ground while maintaining the inplane shape. The upper surface 21 of the outer shroud 12 is convexed and includes mounting holes 23 adapted to receive the motor 14, and air inlet ports 25. A hole 27 directly on center of the outer shroud 12 receives a drive shaft 32 from the motor 14.

The lawn mower 10 further comprises an inner shroud 20 rigidly joined to, and spaced from the outer shroud 12 by screws 22 extending into spacers 24 integral with the inner shroud. The inner shroud 20 is shown in greater detail in FIGS. 4 and 5. A hollow grass ejector 26 is formed integral with the inner shroud 20, and is dimensioned so as to extend through an aperture 28 in the outer shroud 12 (note FIG. 3) to communicate between the blade and the collection receptacle 12. A rubber gasket 30 in the aperture 28 perfects an airtight seal between the grass ejector 26 and the outer shroud 12.

With continuing reference to FIGS. 2 and 3, an impeller 34 is mounted on the shaft 32 in the cavity 36 between the outer and inner shrouds 12 and 20, with a minimum clearance between the impeller and each shroud. A cutting blade 38 is mounted on the shaft 32 axial with the impeller 34. Standoffs 40 are disposed on the shaft 32 in order to allow the height of the blade 38 to be adjusted.

Figure 6:
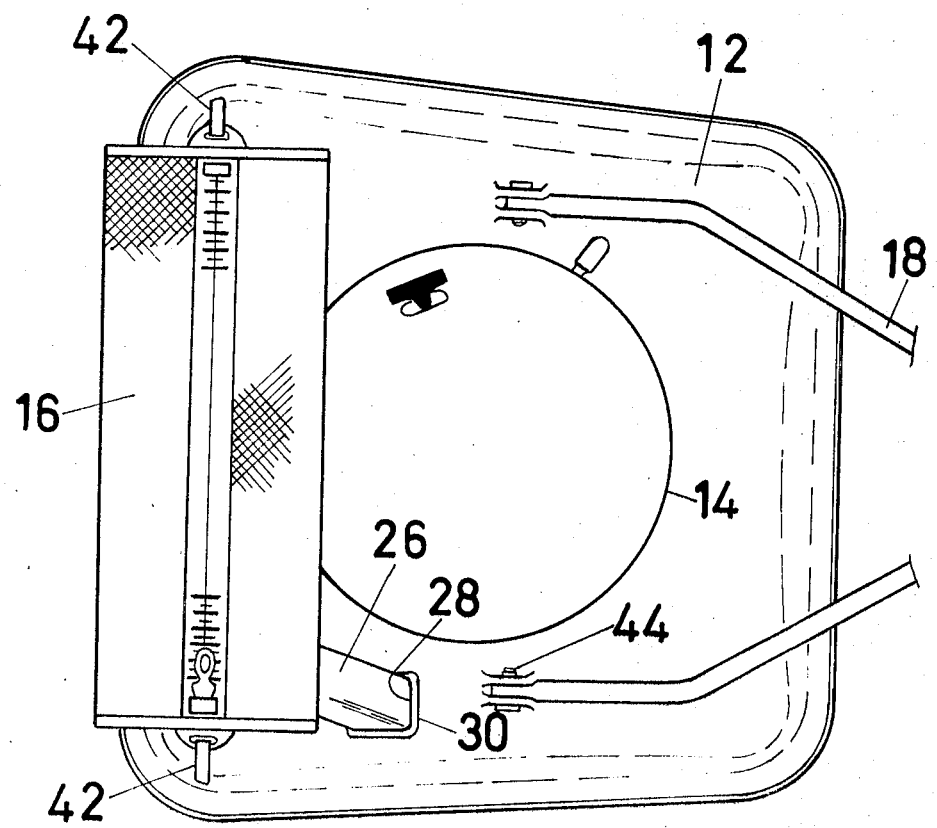
FIGS. 6 and 7 are top plan and side views, respectively, of the apparatus of FIGS. 2 and 3 and further illustrating those portions removed in those previous figures.
Figure 7:
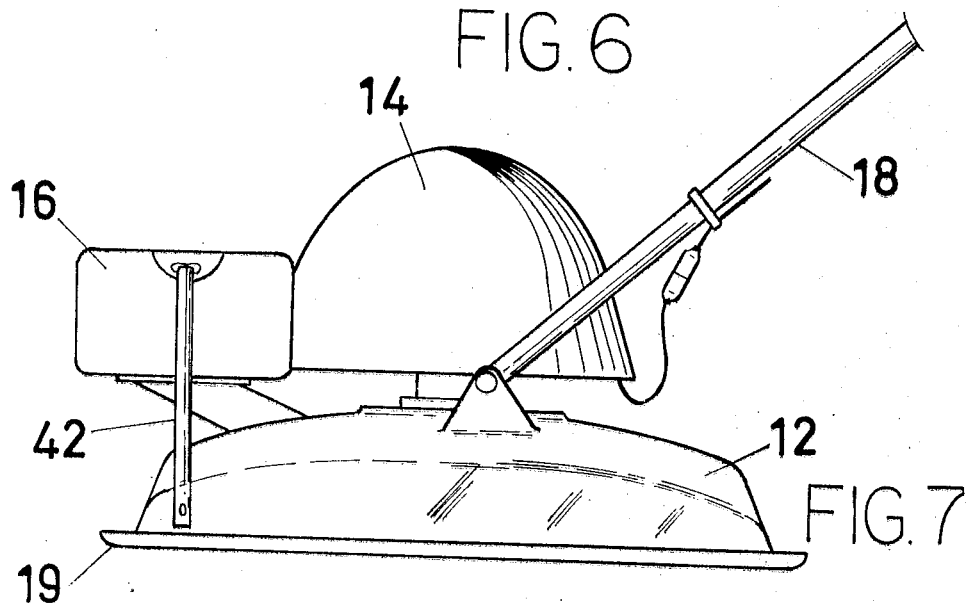

Noting FIGS. 6 and 7, the collector receptacle 12 may, for example, comprise a zippered bag mounted on struts 42. The handle 18 is affixed to the outer shroud 12 by means of attachments 44.

Both the outer and inner shrouds 12 and 20 may be manufactured from light weight injection molded impact plastic, or fiberglass. The impeller 34 may be fabricated from injection molded impact plastic or nylon. The grass collector receptacle 12 may be fabricated from a small open weave plastic with the upper surface stiffened to sit neatly on the struts 42, which may comprise aluminum. The cover for the motor 14 may comprise a high temperature plastic. The handle 18 may be manufactured from aluminum or thin-gauge steel tubing.

The above described embodiment operates in the following manner. Initially air is drawn through the ports 25 by rotation of the impeller 34. When the volume of air being thrown off the tips of the impeller 34 is sufficient to create the requisite pressure, air flow out of the cavity 36 between the two shrouds 12 and 20 will react with the ground and lift the lawn mower 10 in a well known manner. As shown by arrows in FIG. 2, a major portion of the air flowing out of the chamber 36 moves in an outward direction with respect to the cutting blade 38. However, a portion of the escaping air will pass inward, causing grass cut by the blade to be forced in an upward direction. Due to the rotation of the blade 38, the cut grass exhibits a centrifugal movement to the outer periphery of the inner shroud 20 until such time as the grass flows out of the grass ejector 26.

It will be appreciated by those skilled in the art that the present invention improves the state of the art of "lawn manicuring" and allows the weekly chore of lawn cutting to become a pleasant experience. Because of ease in handling, the apparatus of the present invention is a boon to those people that cannot easily handle, for health reasons, the older, more cumbersome type of mower.

The present invention is easily handled with "power off" due to lightweight construction. When energized, the mower of the present invention floats on a pillow of air, and once airborne, can be readily moved in any direction with a minimum of effort thereby obviating the necessity of complicated driving mechanisms.

I claim:

1. A lawn mower comprising:
   apparatus including a blade for cutting;
   a first shroud at least partially surrounding said blade;

a second shroud at least partially surrounding said first shroud;

air impelling means disposed between said shrouds for suspending said apparatus on a cushion of air directed between said first and second shrouds;

means extending through said first and second shrouds for collecting matter cut by said blade; and wherein said impelling means and the peripheries of said two shrouds cooperate to direct a portion of the air from between said first and second shrouds upward toward said blade to carry said cut matter into said collecting means.

2. A lawn mower as recited in claim 1 further comprising prime moving means for simultaneously operating said blade and said suspending means.

3. A lawn mower as recited in claim 2 wherein said collecting means communicates between said blade and an area external to said second shroud.

4. A lawn mower as recited in claim 3 wherein said collecting means comprises a hollow member extending from the periphery of said first shroud.

5. A lawn mower as recited in claim 4 wherein said hollow member extends tangential to the periphery of said first shroud.

6. A lawn mower as recited in claim 5 further comprising a collection receptacle communicating with said hollow member and said area external to said second shroud.

7. A lawn mower as recited in claim 6 further comprising:

said prime mover mounted on the external surface of said second shroud;

said prime mover comprising a shaft extending through said first and second shrouds; and said impeller and said blade axially mounted on said shaft.

* * * * *